United States Patent
Dedeoglu et al.

(10) Patent No.: US 10,152,674 B2
(45) Date of Patent: Dec. 11, 2018

(54) ACCELERATED DECISION TREE EXECUTION

(71) Applicant: Texas Instruments Incorporated, Dallas, TX (US)

(72) Inventors: Goksel Dedeoglu, Plano, TX (US); Peter Charles Barnum, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 66 days.

(21) Appl. No.: 13/742,355

(22) Filed: Jan. 16, 2013

(65) Prior Publication Data

US 2013/0185239 A1     Jul. 18, 2013

Related U.S. Application Data (60) Provisional application No. 61/586,916, filed on Jan. 16, 2012.

(51) Int. Cl.
  *G06N 5/02*    (2006.01)
  *G06N 5/00*    (2006.01)

(52) U.S. Cl.
  CPC .............. *G06N 5/02* (2013.01); *G06N 5/003* (2013.01)

(58) Field of Classification Search
  CPC .................................. G06N 5/003; G06N 5/02
  See application file for complete search history.

(56) References Cited

U.S. PATENT DOCUMENTS

| 8,290,882 B2 | 10/2012 | Sharp |
| 2004/0003356 A1* | 1/2004 | Dewey, III .......... G06F 17/5036 716/115 |
| 2010/0027895 A1* | 2/2010 | Noguchi et al. .............. 382/224 |
| 2010/0094800 A1* | 4/2010 | Sharp .............................. 706/55 |
| 2010/0329517 A1* | 12/2010 | Zhang ................ G06K 9/00248 382/118 |
| 2011/0283059 A1* | 11/2011 | Govindarajan et al. ...... 711/104 |
| 2012/0314031 A1 | 12/2012 | Shotton et al. |

OTHER PUBLICATIONS

Rosten, E. et al. "Machine learning for high-speed corner detection." Computer Vision—ECCV 2006. Springer Berlin Heidelberg, 2006. pp. 430-443. [retrieved Nov. 19, 2014].*

(Continued)

*Primary Examiner* — Eric Nilsson
(74) *Attorney, Agent, or Firm* — Michelle F. Murray; Charles A. Brill; Frank D. Cimino (57) ABSTRACT

A method for accelerated decision tree execution in a processor of a digital system is provided that includes receiving at least some attribute values of a plurality of attribute values of a query for the decision tree in a pre-processing component, evaluating the received attribute values in the pre-processing component according to first early termination conditions corresponding to a first decision to determine whether or not the received attribute values fulfill first early termination conditions, and querying the decision tree with the plurality of attribute values when the received attribute values do not fulfill the first early termination conditions.

15 Claims, 8 Drawing Sheets

(56) References Cited

OTHER PUBLICATIONS

El-Atawy, A., et al. "Adaptive early packet filtering for defending firewalls against DoS attacks." INFOCOM 2009, IEEE. IEEE, 2009.*
"TMS320DM6467 Digital Media System-on-Chip", SPRS403G, Texas Instruments Incorporated, Dec. 2007, Revised Oct. 2010, pp. 1-355.
Edward Rosten and Tom Drummond, "Machine Learning for High-Speed Corner Detection", Proceedings 9th European Conference on Computer Vision (ECCV'06), Graz, May 2006, pp. 430-443.
Toby Sharp, "Implementing Decision Trees and Forests on a GPU", Computer Vision—ECCV 2008 in Computer Vision, Lecture Notes in Computer Science, vol. 5305, 2008, pp. 595-608.
Neil Birkbeck et al, "Fast Boosting Trees for Classification, Pose Detection, and Boundary Detection on a GPU", 2011 IEEE Computer Society Conference on Computer Vision and Pattern Recognition Workshops (CVPRW), Jun. 20-25, 2011, pp. 36-41.

* cited by examiner

ACCELERATED DECISION TREE EXECUTION

CROSS-REFERENCE TO RELATED APPLICATIONS

This application claims benefit of U.S. Provisional Patent Application Ser. No. 61/586,916, filed Jan. 16, 2012, which is incorporated by reference herein in its entirety.

REFERENCE TO SEQUENCE LISTING

This application includes a computer program listing appendix containing three computer program listings. The appendix is submitted in three files in the requisite ASCII text format: fast_9.txt, fast_12.txt, and accelerationCode.txt. The computer program listing appendix is incorporated by reference herein.

BACKGROUND OF THE INVENTION

Field of the Invention

Embodiments of the present invention generally relate to acceleration of decision tree execution.

Description of the Related Art

Decision trees are typically traversed (executed) in a serial fashion. For each query, a decision tree is traversed by starting from the root node, evaluating the decision function on the query, and then moving on to the appropriate sub-tree. This is repeated until a leaf node is reached, which encodes the decision/classification result for the particular query.

Decision trees implemented thusly are well suited for scalar architectures that excel on conditional branching, such as the general purpose x86 and ARM microprocessors. However, decision trees are now commonly used to analyze data on parallel processors such as data and instruction parallel digital signal processors (DSPs), graphics processing units (GPUs), and vector processing engines. Accordingly, improving execution efficiency of decision trees on such processors is desirable.

SUMMARY

Embodiments of the present invention relate to accelerating execution of decision trees. In one aspect, a method for accelerated decision tree execution in a processor of a digital system is provided that includes receiving at least some attribute values of a plurality of attribute values of a query for the decision tree in a pre-processing component, evaluating the received attribute values in the pre-processing component according to first early termination conditions corresponding to a first decision to determine whether or not the received attribute values fulfill first early termination conditions, and querying the decision tree with the plurality of attribute values when the received attribute values do not fulfill the first early termination conditions.

In one aspect, a digital system configured for accelerated decision tree execution is provided that includes a processor, and means for storing software instructions executable by the processor, wherein the software instructions, when executed by the processor, cause the processor to receive at least some attribute values of a plurality of attribute values of a query for a decision tree in a pre-processing component, evaluate the received attribute values in the pre-processing component according to first early termination conditions corresponding to a first decision to determine whether or not the received attribute values fulfill first early termination conditions, and query the decision tree with the plurality of attribute values when the received attribute values do not fulfill the first early termination conditions.

In one aspect, a non-transitory computer-readable medium storing software instructions is provided. The software instructions, when executed by a processor, cause a method for accelerated decision tree execution to be performed, the method including receiving at least some attribute values of a plurality of attribute values of a query for the decision tree in a pre-processing component, evaluating the received attribute values in the pre-processing component according to first early termination conditions corresponding to a first decision to determine whether or not the received attribute values fulfill first early termination conditions, and querying the decision tree with the plurality of attribute values when the received attribute values do not fulfill the first early termination conditions.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Embodiments of the invention provide for acceleration of decision tree execution on computing devices with parallel processing capability, e.g., digital signal processors (DSPs), graphics processing units (GPUs), vector processing engines, and the like. For simplicity of description, embodiments are described in reference to a DSP. One of ordinary skill in the art will appreciate embodiments for other computing devices.

Figure 1:
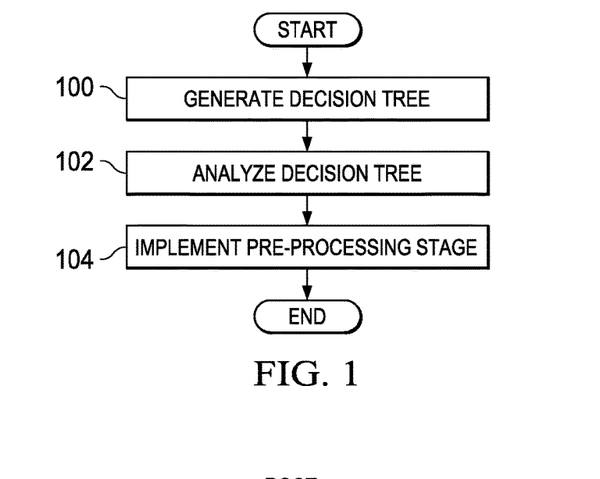
FIGS. 1, 3, and 5 are flow diagrams of methods.

FIG. 1 is a flow diagram of a method for generating an accelerated decision tree implementation for execution on a target DSP. Initially, the decision tree is generated 100. That is, software instructions implementing the decision tree are generated. Any suitable decision tree generation program may be used to generate the decision tree. In general, a decision tree is generated by learning from large sets of pre-classified data, i.e., a training set. The learned decision tree may then be used to predict decisions/classifications.

Figure 2A:
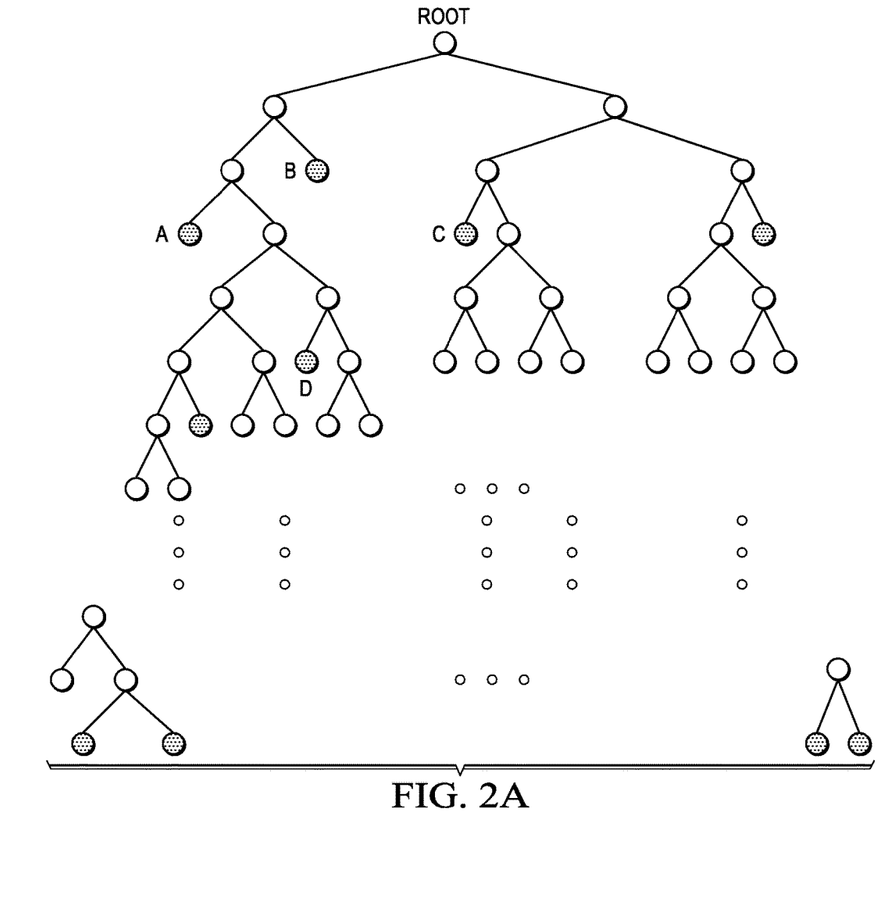
FIGS. 2A-2D and FIG. 4 are examples.

FIG. 2A shows an example graphical representation of a decision tree. The decision tree includes nodes, depicted as white circles, and leaf nodes, depicted as black circles. Further, the binary decision tree is a tree in which each node except the root node has one parent node, and each parent node has two child nodes. Each parent node indicates evaluation of a condition and each leaf node indicates a classification, i.e., a decision. Each node has a depth level within the decision tree which is the total number of nodes traversed from the root node to the node (including the root node and the node itself). For example, the depth level of node D is 6. Evaluation of a query begins with the root node and proceeds along a path through one or more of the other nodes, depending on the result of evaluating the conditions at each node, until a leaf node is reached. A full decision tree may have many levels, hundreds or thousands of nodes, and may have numerous leaf nodes at the bottom Referring again to FIG. 1, after the decision tree is generated 100, the decision tree is analyzed 102 to identify early termination conditions that occur often enough to impact the overall execution/parsing of the decision tree. "Early termination" is a relative concept, i.e., it means that relative to other leaf nodes at deeper levels, early termination leaf nodes are reached quicker. For these nodes to have impact on the overall execution/parsing of the decision tree, the expected query data should be such that the early termination condition occurs frequently enough. This is data-dependent behavior that may not amenable to modeling without samples, i.e., that may not be apparent from visual inspection, as the depth of a leaf node is not necessarily indicative of how often the leaf node will be actually reached in a representative sample of the data. Nevertheless, the average number of node evaluations per query over a large number of representative queries may be indicative that such early termination conditions are present. In FIG. 2A, leaf nodes A, B, and C are examples of early termination conditions identified by analysis of the decision tree and representative data samples.

A pre-processing stage for the decision tree is then implemented 104 based on the identified early termination conditions. The pre-processing stage is software instructions to be executed before a full query of the decision tree. These instructions capture the early termination cases and execute them for a query prior to any execution of the full decision tree. If a decision is reached in the pre-processing stage, a query of the full decision tree is avoided. Further, the pre-processing stage may be implemented in a fashion that is more amenable to parallel execution on a DSP, e.g., that instructions may avoid the branching behavior of the decision tree implementation and/or use single-instruction-multi-data (SIMD) instructions in the instruction set architecture (ISA) of the DSP to speed up execution.

Figure 2B:
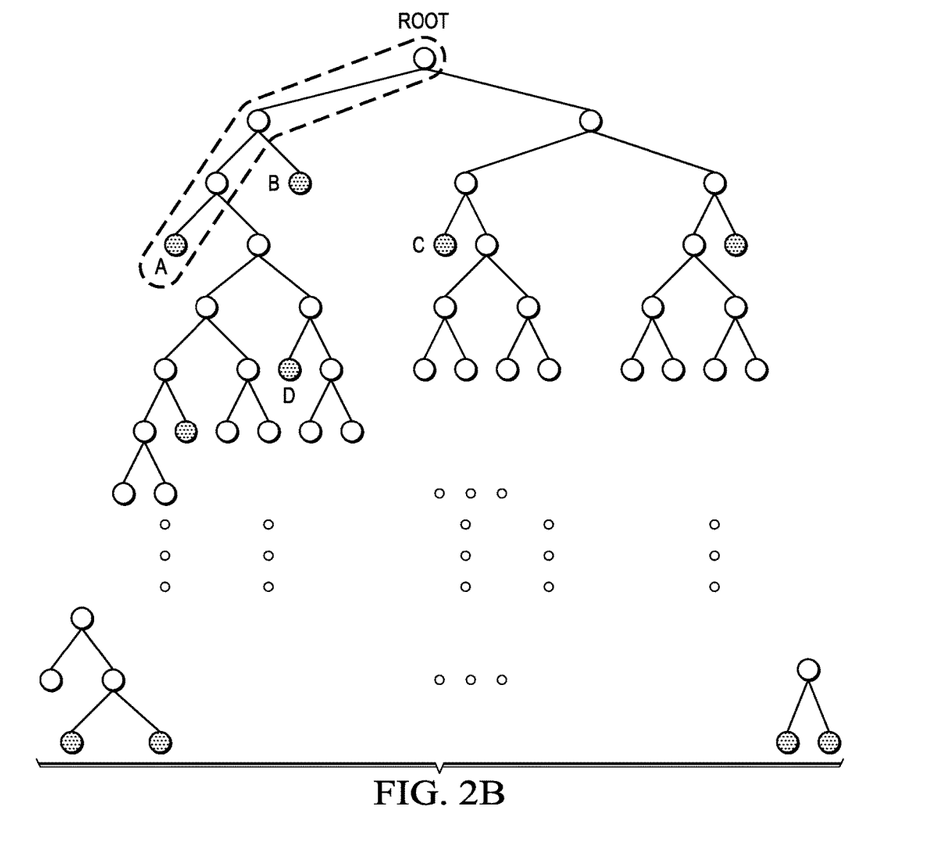
Figure 2C:
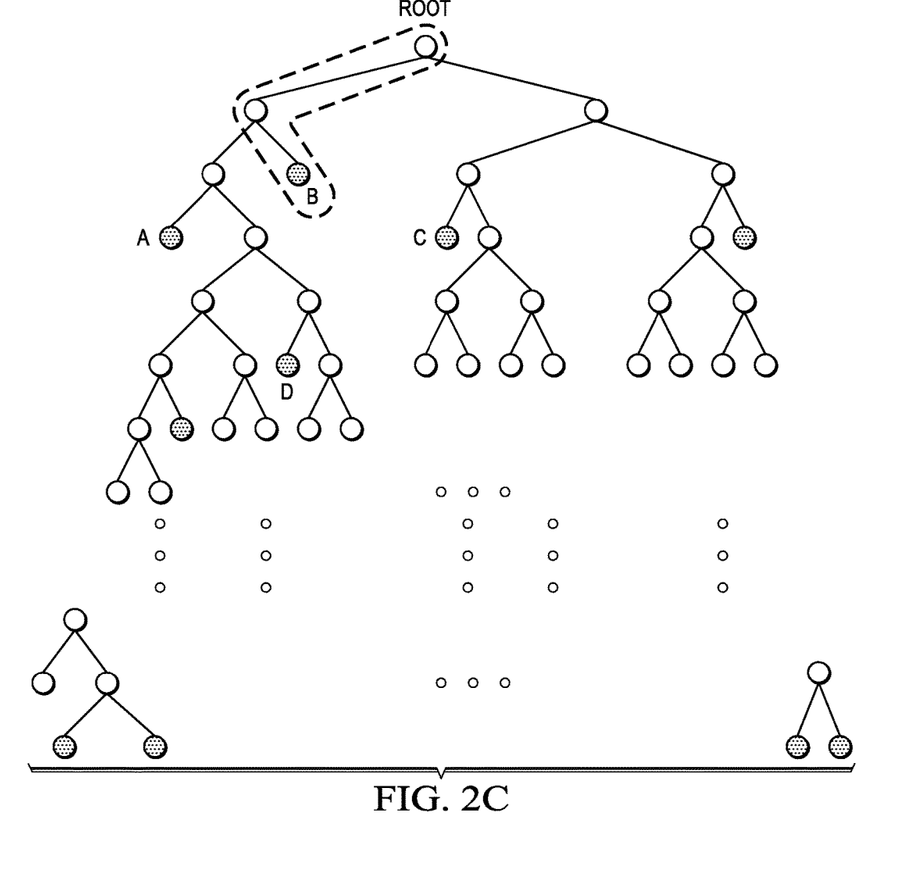
Figure 2D:
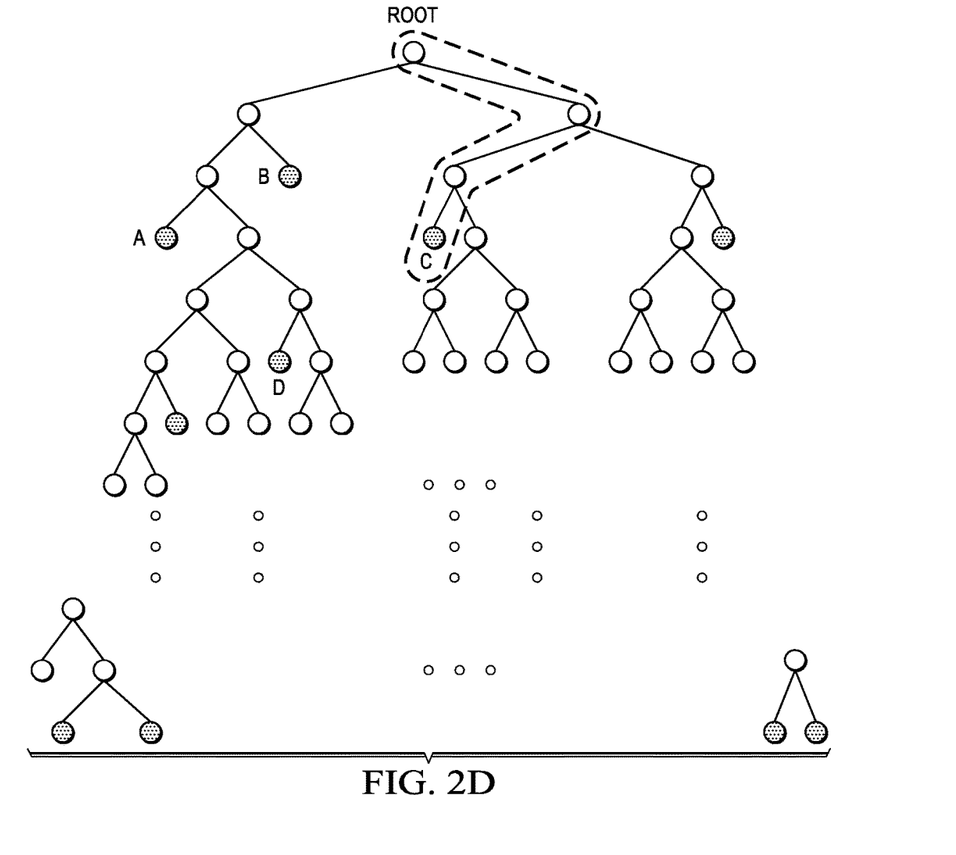

In some embodiments, the early termination conditions are extrapolated from the analysis and may not correspond directly to particular leaf nodes in the decision tree. This is explained in more detail in reference to the example of FIGS. 4 and 5. In some embodiments, the early termination conditions embodied in the pre-processing stage may be taken directly from the decision tree. FIGS. 2B, 2C, and 2D illustrate the conditions for, respectively, leaf nodes A, B, and C of the example decision tree of FIG. 2A. Note that to reach leaf nodes A and C, three conditions are tested and to reach leaf node B, two conditions are tested. The conditional execution to reach these early termination conditions may be unrolled and implemented in the pre-processing stage. Table 1 shows example pseudo code illustrating an example "unrolling". In this table, condition A implements the testing of each of the conditions in the condition path of FIG. 2B, condition B implements the testing of each of the conditions in the condition path of FIG. 2C, and condition C implements the testing of each of the conditions in the condition path of FIG. 2D.

For example, assume that the decision tree is designed to provide a miles per gallon (mpg) estimate given certain attributes of a vehicle such as weight, length, and age. Also assume that the root node tests a weight condition, the left child node tests a length condition (note that this node is the parent node of leaf node B), and the parent node of leaf node A tests an age condition. Accordingly, condition A in Table 1 will test the weight, length, and age conditions against the values of the weight, length, and age attributes of the decision tree query, e.g., if (weight<2000 kg) and (length<12 feet) and (age<10 yrs), then classify mpg as ">10 mpg". Similarly, condition B in Table 1 will test the weight and length conditions against the values of the weight and length attributes of the decision tree query, e.g., if (weight<2000 kg) and (length>12 feet), then classify mpg as "between 10 mpg and 15 mpg".

TABLE 1 if (condition A)
    then return(result of leaf node A);
if (condition B)
    then return(result of leaf node B);
if (condition C)
    then return(result of leaf node C);

Referring again to FIG. 1, once the pre-processing stage is implemented 104, it is packaged with the decision tree implementation to create the accelerated decision tree implementation. Software instructions (in addition to those implementing the early termination conditions and those implementing the decision tree) may be added to cause the pre-preprocessing stage to receive any queries and process them, passing any queries that remain unresolved to the decision tree for full evaluation.

Because the pre-processing stage has a fixed program flow (i.e., eliminates or reduces branching behavior), it may be amenable to optimization on data-parallel as well as multi-stage pipeline architectures. Further, this method takes the extremely sequential process of decision tree parsing and extracts a component amenable to acceleration as compared to the sequential process. For this approach to prove more efficient than the straightforward decision tree parsing, just a few of the queries need to hit a leaf node quickly. Assuming the accelerated parsing brings a speedup factor of T, and the probability of finding a leaf node is P, then this approach may be useful if $P \geq 1/T$. The computational trade-off between pre-processing and regular decision tree parsing may vary significantly from one problem to another. But for a wide variety of tree-search algorithms, even minor acceleration of the initial decisions could greatly increase overall execution speed.

Figure 3:
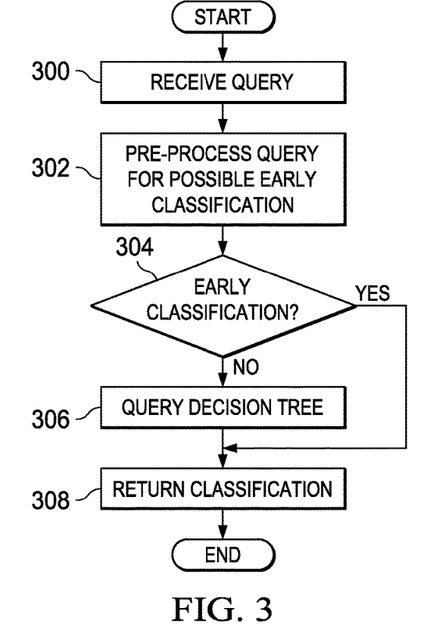

FIG. 3 is a flow diagram of a method for using an accelerated decision tree on a DSP. Initially, a query is received 300. The query includes values of attributes that are considered by the decision tree to reach a classification, e.g., in the previous mpg example, the attributes values in a query would be at least weight, length, and age of a vehicle. The query is processed 302 by the pre-processing stage of the accelerated decision tree for possible early classification. If the query results in an early classification 304, the classification is returned 308, and the execution of the decision tree is skipped; otherwise, the query is evaluated by the decision tree 306, and the resulting classification is returned 308.

Figure 4:
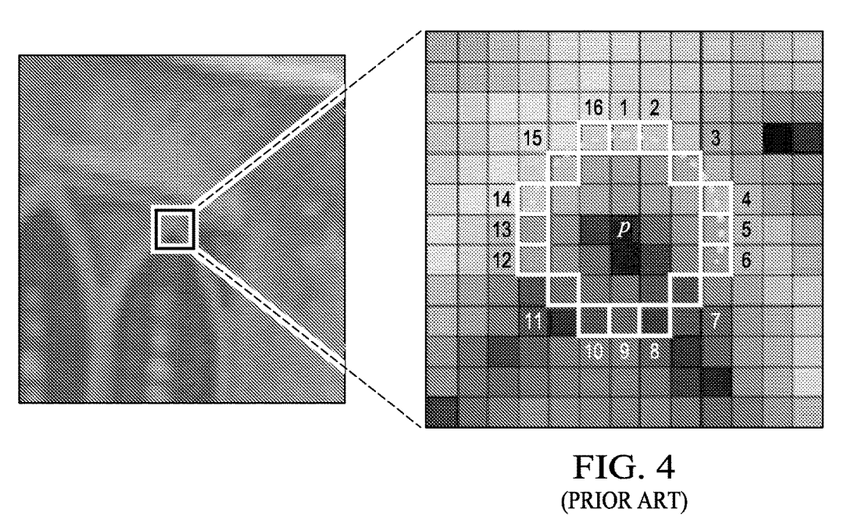
Figure 5:
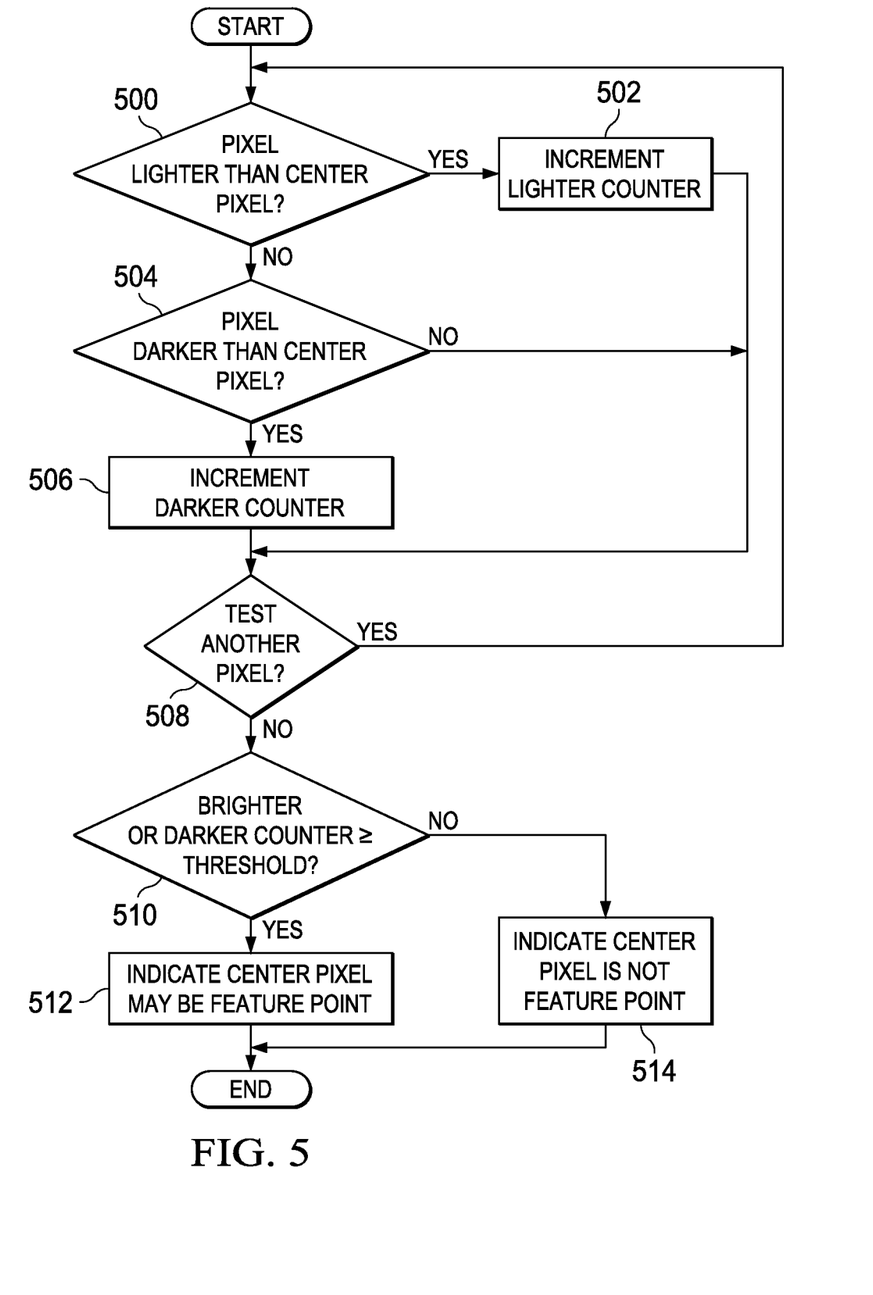

FIGS. 4 and 5 illustrate an example of an accelerated decision tree for locating feature points (also referred to as corners) in a digital image. This accelerated decision tree is based on the FAST corner detection algorithm described in E. Rosten and T. Drummond, "Machine Learning for High-Speed Corner Detection," Proceedings of the $9^{th}$ European Conference on Computer Vision (ECCV'06), vol. part I, 2006, pp. 430-443 ("Rosten" herein), which is incorporated by reference herein. This algorithm classifies whether or not a pixel in an image is a feature point ("FAST corner") by comparing the intensity of a candidate pixel against a predetermined set of neighboring pixels. The set of neighbors for one version of the FAST algorithm is illustrated by the dashed arc in FIG. 4, which is copied from Rosten.

The pixel classification described in Rosten is performed using a computer-generated decision tree. There are multiple versions of the FAST algorithm referred to as FAST-x, where x refers to the number of segments tested. Learned decision trees for FAST-9 and FAST-12 are provided the computer program listing appendix. These are examples of decision trees that may form the decision tree portion of an accelerated decision tree for finding feature points in digital images.

The pre-processing portion of the accelerated decision tree is designed based on early termination conditions extrapolated through analysis. Rosten reports that an analysis of the FAST-9 and FAST-12 decision trees shows that on average there are 2.26 decisions per pixel for the FAST-9 decision tree and 2.39 decisions per pixel for the FAST-12 decision tree. This would seem to indicate that accelerating some early decisions may result in significant performance improvement, i.e., there exist some early termination conditions that could be extracted from the decision tree(s). The particular early termination conditions identified for acceleration determine if a candidate pixel is not a feature point based on the relative brightness or darkness of four neighboring pixels as compared to the candidate pixel. These conditions are explained more detail in the description of the method of FIG. 5.

FIG. 5 is a flow diagram of a method for the pre-processing stage of the accelerated decision tree for locating feature points. In general, this method decides whether a given pixel is not a feature point based on four specific neighboring pixels centered on the candidate pixel in the four cardinal directions, e.g., pixels 1, 5, 9, and 13 in FIG. 4. In the method, a neighboring pixel is tested 500 to determine if it is sufficiently lighter than the center pixel. This test may be based on an intensity difference threshold. If the neighboring pixel is sufficiently lighter, the lighter pixel counter is incremented 502 and the next neighboring pixel, if any 508, is tested. Otherwise, the neighboring pixel is tested 504 to determine if it is sufficiently darker than the center pixel. This test may be based on an intensity difference threshold. If the neighboring pixel is sufficiently darker, the darker pixel counter is incremented 506 and the next neighboring pixel, if any 508, is tested. If the neighboring pixel is neither sufficiently lighter nor sufficiently darker than the center pixel, testing continues with next neighboring pixel, if any 508.

Once the four neighboring pixels are tested, the brighter and darker pixel counters are compared 510 to a threshold count. In some embodiments, the threshold count is three. Other threshold count values may be used. If the value of either the brighter pixel counter or the darker pixel counter is greater than or equal to the threshold count, then the center pixel may be a feature point and should be evaluated by the decision tree. Accordingly, an indicator is set 512 indicating that the pixel may be a feature point. If the values of both the brighter pixel counter and the darker pixel counter are less than the threshold count, the center pixel is classified as not being a feature point. Accordingly, an indicator is set 514 indicating that the pixel is not a feature point.

Using this method, it may be possible that only 3 to 10% of the pixels processed by the pre-processing stage will need to be evaluated by the full decision tree. Note that this method indicates for each pixel tested whether the particular pixel is not a feature or may be a feature. This allows multiple pixels to be tested, such as in a row or an image or in an entire image, prior to using the decision tree to evaluate the pixels that were not classified as not a feature point. If the use of the decision tree to evaluate a pixel not successfully classified by the pre-processing stage is to be performed immediately after the pre-processing stage is performed on that pixel, the steps of indicating the result of the pre-processing stage may be eliminated.

This method was implemented for execution on a DSP as a pre-processing stage for the FAST-12 decision tree. An example implementation is included in the computer program listing appendix in the accelerationCode.txt file. Further, the implementation took advantage of the SIMD instruction set of the DSP to perform the lighter/darker counting for four pixels simultaneously. Note the use of the intrinsics in the example implementation. The names of these intrinsics incorporate the name of the underlying SIMD instruction. The particular instruction set is the instruction set for the Texas Instruments C6x line of DSPs. The main loop of this example implementation requires approximately 2.5 cycles per pixel. For DSPs with wider or narrower SIMD instructions, more than four pixels or less than four pixels may be processed simultaneously.

When used with the FAST-12 decision tree, a performance increase of 3× to 8× was measured for various images versus using the decision tree to evaluate all pixels. The method may also be implemented for use with the FAST-9 decision tree. The feature detection results may differ slightly from the FAST-12 case, but the expected increase in performance may be higher.

Figure 6:
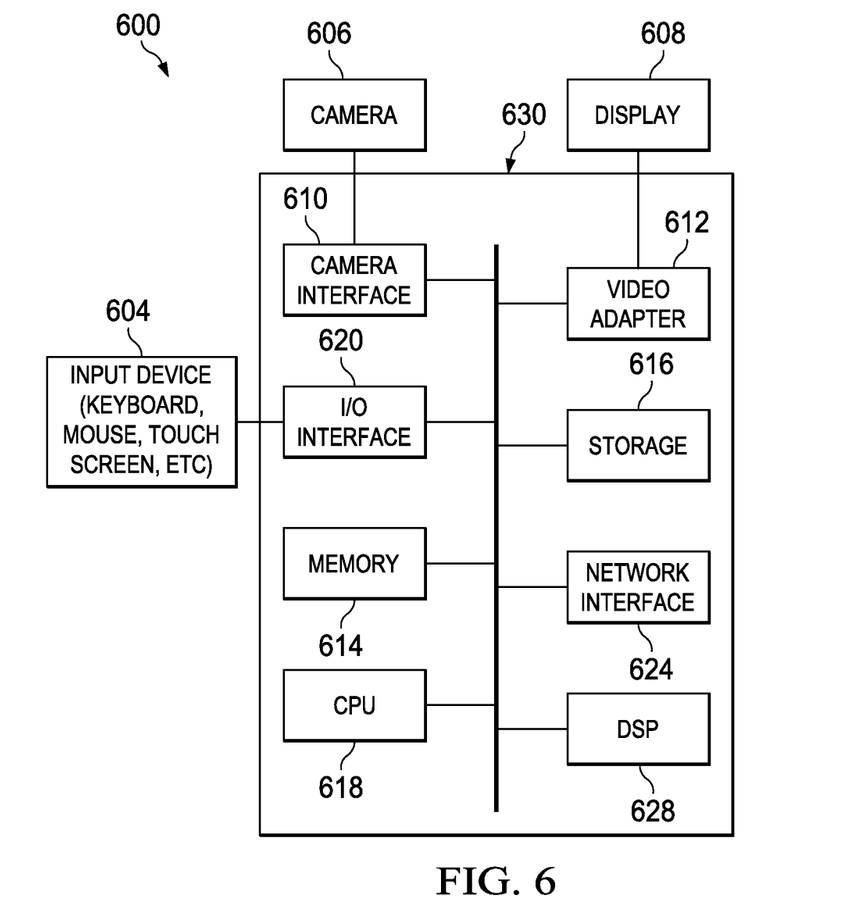
FIG. 6 is a block diagram of a computer system.

FIG. 6 is a block diagram of a computer system 600 in which embodiments of the above described methods may be implemented. The computer system 600 includes a processing unit 630 equipped with one or more input devices 604 (e.g., a mouse, a keyboard, or the like), and one or more output devices, such as a display 608, or the like. In some embodiments, the display 608 may be touch screen, thus allowing the display 608 to also function as an input device. The processing unit 630 may be, for example, a desktop computer, a workstation, a laptop computer, a dedicated unit customized for a particular application, or the like. The display may be any suitable visual display unit such as, for example, a computer monitor, an LED, LCD, or plasma display, a television, a high definition television, or a combination thereof.

The processing unit 630 includes a central processing unit (CPU) 618, memory 614, a storage device 616, a video adapter 612, an I/O interface 620, a DSP 628, and a network interface 624 connected to a bus. The bus may be one or more of any type of several bus architectures including a memory bus or memory controller, a peripheral bus, video bus, or the like.

The CPU 618 may be any suitable type of electronic data processor. For example, the CPU 618 may be a processor from Intel Corp., a processor from Advanced Micro Devices, Inc., a Reduced Instruction Set Computer (RISC), an Application-Specific Integrated Circuit (ASIC), or the like. The DSP 628 may be any suitable type of digital signal processor, such as, for example, a DSP of the C64x or C66x family of digital signal processors available from Texas Instruments. The CPU 618 and the DSP 628 are arranged to execute software instructions stored in the storage device 616 and/or the memory 614 to perform aspects of the methods.

The storage device 616 (e.g., a computer readable medium) may comprise any type of storage device configured to store data, programs, and other information and to make the data, programs, and other information accessible via the bus. The storage device 616 may be, for example, one or more of a hard disk drive, a magnetic disk drive, an optical disk drive, or the like. The memory 614 (e.g., a computer readable memory) may be any suitable type of system memory such as static random access memory (SRAM), dynamic random access memory (DRAM), synchronous DRAM (SDRAM), read-only memory (ROM), flash memory, a combination thereof, or the like. Further, the memory 614 may include ROM for use at boot-up, and DRAM for data storage for use while executing programs. Separate memory and storage devices may be provided for the CPU 618 and the DSP 628 and/or the CPU 618 and the DSP 628 may share the memory and storage devices.

The software instructions implementing an embodiment of an accelerated decision tree as described herein may be initially stored in a computer-readable medium such as a compact disc (CD), a diskette, a tape, a file, memory, or any other computer readable storage device and loaded (if needed) and executed by the DSP 628. In some cases, the software instructions may also be sold in a computer program product, which includes the computer-readable medium and packaging materials for the computer-readable medium. In some cases, the software instructions may be distributed to the computer system 600 via removable computer readable media (e.g., floppy disk, optical disk, flash memory, USB key), via a transmission path from computer readable media on another computer system (e.g., a server), etc.

The video adapter 612 and the I/O interface 620 provide interfaces to couple external input and output devices to the processing unit 630. As illustrated in FIG. 6, examples of input and output devices include the display 608 coupled to the video adapter 612 and the mouse/keyboard 604 coupled to the I/O interface 620.

The network interface 624 allows the processing unit 630 to communicate with remote units via a network (not shown). The network interface 624 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

The computer system 600 may also include other components not specifically shown. For example, the computer system 600 may include power supplies, cables, a motherboard, removable storage media, cases, and the like.

In some embodiments, the accelerated decision tree implemented by the software instructions is an accelerated decision tree for feature point detection as described herein. In such embodiments, the DSP 628 may execute the software instructions of the accelerated decision tree to process images such as, for example, images captured by the camera 606 or images provided to the computer system 600 via the network interface 624.

In some embodiments, software development tools and decision tree learning tools may be stored in the memory 614 and/or the storage 616 that may be executed by the CPU 618. A user may use these tools to generate an accelerated decision tree that is executable by the DSP 628 as per an embodiment of a method described herein.

Figure 7:
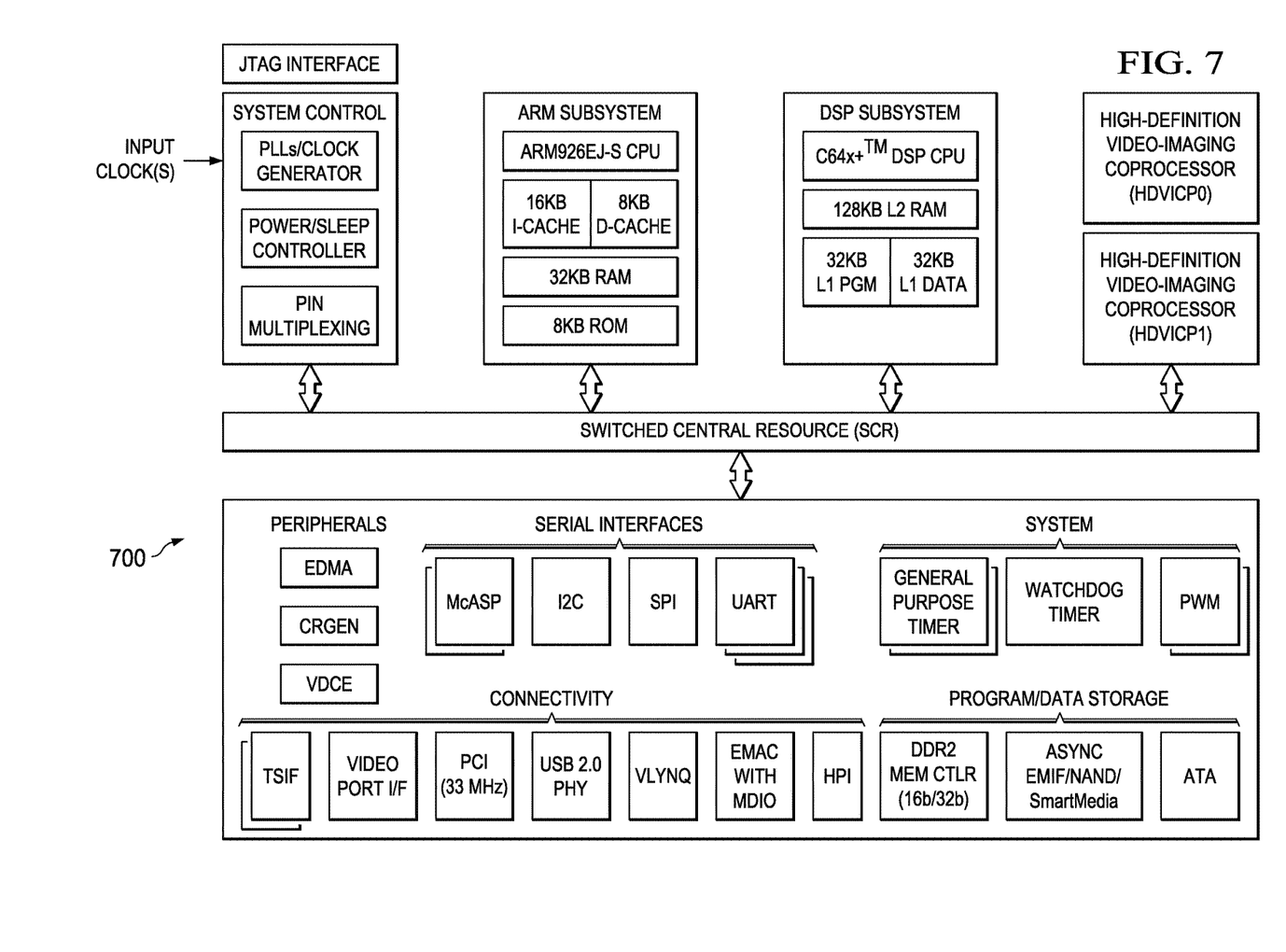
FIG. 7 is a block diagram of an illustrative digital system.

FIG. 7 is a block diagram of an example digital system suitable for use as an embedded system that may be configured to perform an embodiment of a method for using an accelerated decision tree as described herein. In some embodiments, the accelerated decision tree is an accelerated decision tree for feature point detection as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 700 is a programmable platform designed to meet the processing needs of applications such as video encode/decode/transcode/transrate, video surveillance, video conferencing, set-top box, medical imaging, media server, gaming, digital signage, etc. The SoC 700 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 700 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 700, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 700 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 7, the SoC 700 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, mode decision, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 700 may be configured to perform an embodiment of a method for using an accelerated decision tree as described herein. Executable instructions implementing the accelerated decision tree may stored in a computer readable medium and loaded (if needed) and executed by the DSP. The accelerated decision tree may be used, for example, as part of video and/or image analysis performed by the SoC 700. In some embodiments, the accelerated decision tree is an embodiment of an accelerated decision tree for feature point detection as described herein.

Other Embodiments

While the invention has been described with respect to a limited number of embodiments, those skilled in the art, having benefit of this disclosure, will appreciate that other embodiments can be devised which do not depart from the scope of the invention as disclosed herein.

It is therefore contemplated that the appended claims will cover any such modifications of the embodiments as fall within the true scope of the invention.

What is claimed is:

1. A method for accelerated decision tree execution in a digital signal processor (DSP) of a system-on-a-chip (SoC), using single-instruction-multi-data (SIMD) instructions in an instruction set architecture (ISA) of the DSP, the method comprising:
    receiving, by the DSP, at least some attribute values of a plurality of attribute values of a query for a decision tree in a pre-processing component;
    evaluating, by the DSP, with a fixed program flow, the received attribute values in the pre-processing component according to an early termination condition and without querying the decision tree to determine whether or not the received attribute values fulfill the early termination condition, the early termination condition corresponding to multiple conditions that occur at different nodes in a condition path between a root node and a leaf node of the decision tree; and
    querying, by the DSP, the decision tree with the plurality of attribute values in response to determining that the received attribute values do not fulfill the early termination condition.

2. The method of claim 1, wherein the leaf node is a first leaf node, wherein the early termination condition is a first early termination condition corresponding to the first leaf node of the decision tree, and wherein evaluating the received attribute values includes evaluating the received attribute values according to a second early termination condition corresponding to a second leaf node of the decision tree to determine whether or not the received attribute values fulfill the second early termination condition.

3. The method of claim 1, wherein the early termination condition corresponds to conditions that would be evaluated in the decision tree to reach the leaf node.

4. The method of claim 1, wherein the leaf node corresponds to a first decision, and wherein the decision tree determines whether or not a pixel in a digital image is a feature point, the first decision is that the pixel is not a feature point, the received attribute values of the query include values of a set of neighboring pixels of the pixel, and the early termination condition considers relative brightness and darkness of a selected subset of the set of neighboring pixels as compared to the pixel.

5. The method of claim 4, wherein early termination conditions are evaluated in parallel in the pre-processing component for a plurality of pixels in the digital image.

6. A non-transitory computer-readable storage medium storing a program for execution by a digital signal processor (DSP) of a system on-a-chip (SoC), the program for accelerated decision tree execution, the program including instructions to, using single-instruction-multi-data (SIMD) instructions in an instruction set architecture (ISA) of the DSP:
    receive at least some attribute values of a plurality of attribute values of a query for a decision tree in a pre-processing component;
    evaluate, with a fixed program flow, the received attribute values in the pre-processing component according to an early termination condition and without querying the decision tree to determine whether or not the received attribute values fulfill the early termination condition, the early termination condition corresponding to multiple conditions that occur at different nodes in a condition path between a root node and a leaf node of the decision tree ; and
    query the decision tree with the plurality of attribute values in response to determining that the received attribute values do not fulfill the early termination condition.

7. The non-transitory computer-readable storage medium of claim 6, wherein the leaf node is a first leaf node, wherein the early termination condition is a first early termination condition corresponding to the first leaf node of the decision tree, and wherein the instructions further comprise instructions to evaluate the received attribute values according to a second early termination condition corresponding to a second leaf node of the decision tree to determine whether or not the received attribute values fulfill the second early termination condition.

8. The non-transitory computer-readable storage medium of claim 6, wherein the early termination condition corresponds to conditions that would be evaluated in the decision tree to reach the leaf node.

9. The non-transitory computer-readable storage medium of claim 6, wherein the leaf node corresponds to a first decision, and wherein the decision tree determines whether or not a pixel in a digital image is a feature point, the first decision is that the pixel is not a feature point, the received attribute values of the query include values of a set of neighboring pixels of the pixel, and the early termination condition considers relative brightness and darkness of a selected subset of the set of neighboring pixels as compared to the pixel.

10. The non-transitory computer-readable storage medium of claim 9, wherein the multiple conditions are evaluated in parallel in the pre-processing component for a plurality of pixels in the digital image.

11. A system-on-a-chip (SoC) configured for accelerated decision tree execution, the SoC comprising:
    a digital signal processor (DSP); and
    a non-transitory computer readable storage medium storing a program for execution by the DSP, the program including instructions to, using single-instruction-multi-data (SIMD) instructions in an instruction set architecture (ISA) of the DSP:
        receive at least some attribute values of a plurality of attribute values of a query for a decision tree in a pre-processing component;
        evaluate, with a fixed program flow, the received attribute values in the pre-processing component according to an early termination condition and without querying the decision tree to determine whether or not the received attribute values fulfill the early termination condition, the early termination condition corresponding to multiple conditions that occur at different nodes in a condition path between a root node and a leaf node of the decision tree; and query the decision tree with the plurality of attribute values in response to determining that the received attribute values do not fulfill the early termination condition.

12. The SoC of claim 11, wherein the leaf node is a first leaf node, wherein the early termination condition is a first early termination condition corresponding to the first leaf node of the decision tree, and wherein the instructions further comprise instructions to evaluate the received attribute values according to a second early termination condition corresponding to a second leaf node of the decision tree to determine whether or not the received attribute values fulfill the second early termination condition.

13. The SoC of claim 11, wherein the early termination condition corresponds to conditions that would be evaluated in the decision tree to reach the leaf node.

14. The SoC of claim 11, wherein the leaf node corresponds to a first decision, and wherein the decision tree is configured to determine whether or not a pixel in a digital image is a feature point, the first decision is that the pixel is not a feature point, the received attribute values of the query include values of a set of neighboring pixels of the pixel, and the early termination condition considers relative brightness and darkness of a selected subset of the set of neighboring pixels as compared to the pixel.

15. The SoC of claim 14, wherein the multiple conditions are evaluated in parallel in the pre-processing component for a plurality of pixels in the digital image.

\* \* \* \* \*